United States Patent
Bai

(10) Patent No.: US 8,538,409 B2
(45) Date of Patent: Sep. 17, 2013

(54) HOME APPLIANCE REMOTE CONTROL METHOD AND WIRELESS NETWORK CARD

(75) Inventor: Chunsheng Bai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/515,283

(22) PCT Filed: Aug. 12, 2010

(86) PCT No.: PCT/CN2010/075932
§ 371 (c)(1),
(2), (4) Date: Jun. 11, 2012

(87) PCT Pub. No.: WO2011/088676
PCT Pub. Date: Jul. 28, 2011

(65) Prior Publication Data
US 2012/0276891 A1    Nov. 1, 2012

(30) Foreign Application Priority Data

Jan. 21, 2010 (CN) .......................... 2010 1 0001082

(51) Int. Cl.
*H04W 4/12* (2009.01)

(52) U.S. Cl.
USPC ...................................... 455/420; 340/12.22

(58) Field of Classification Search
USPC ............ 455/420; 340/12.22, 825.69, 825.72, 340/7.56
See application file for complete search history.

(56) References Cited

U.S. PATENT DOCUMENTS 6,791,467 B1 * 9/2004 Ben-Ze'ev ................. 340/12.25
2007/0258718 A1   11/2007 Furlong et al.

FOREIGN PATENT DOCUMENTS

| CN | 1474558 | 2/2004 |
|---|---|---|
| CN | 1481120 | 3/2004 |
| CN | 2674775 | 1/2005 |
| CN | 1747507 | 3/2006 |
| CN | 1852378 | 10/2006 |
| CN | 1988489 | 6/2007 |
| CN | 101794501 | 8/2010 |
| WO | WO 03/088584 | 10/2003 |

* cited by examiner

*Primary Examiner* — Phuoc Doan
(74) *Attorney, Agent, or Firm* — Pearl Cohen Zedek Latzer, LLP

(57) ABSTRACT

The present invention provides a method for remotely controlling household appliances comprising: storing corresponding relation between household appliance identification information, operation action instructing information and control signal encoding format in a wireless network card integrated with a remote control circuit; a terminal sending a remote control command to a specified wireless network card, the remote control command carrying at least identification information of a controlled household appliance and operation action instructing information; and after receiving the remote control command, the wireless network card analyzing the remote control command and sending a control signal in a corresponding encoding format to the controlled household appliance using the remote control circuit according to the carried identification information of the controlled household appliance, the operation action instructing information and the locally stored corresponding relation. The present invention further provides a wireless network card.

11 Claims, 2 Drawing Sheets

HOME APPLIANCE REMOTE CONTROL METHOD AND WIRELESS NETWORK CARD

CROSS-REFERENCE TO RELATED APPLICATIONS

This application is a National Phase Application of PCT International Application No. PCT/CN2010/075932, entitled "HOME APPLIANCE REMOTE CONTROL METHOD AND WIRELESS NETWORK CARD", International Filing Date Aug. 12, 2010, published on Jul. 28, 2011 as International Publication No. WO 2011/088676, which in turn claims priority from Chinese Patent Application No. 201010001082.3, filed Jan. 21, 2010, both of which are incorporated herein by reference in their entirety.

TECHNICAL FIELD

The present invention relates to the field of communication technology, and in particular, to a method and wireless network card for remotely controlling household appliances.

BACKGROUND OF THE PRIOR ART

At present, the rhythm of the modernized life is more and more fast. In order to save time, people require urgently that the life be more quick and convenient, therefore the requirement for remotely controlling household appliances is brought into schedule gradually. For example, short messages are sent using a mobile phone to control switch of the household appliances, including: to remotely control an air conditioner to turn on in advance before going home in hot summer; to remotely control a microwave oven to heat food in the oven before going home in cold winter; to remotely control a water heater to turn on; and to remotely control a household appliance to turn down in the case of going out and forgetting to turn down the household appliance.

With gradual maturity and generalization of the 3rd-generation (3G) mobile communication technology services in China, wireless network card services exhibit the huge development space. It can be predicted that like American and European developed countries, wireless network cards will certainly be popularized and generalized rapidly in China in the next few years.

The existing technology for remotely controlling household appliances is realized through an intelligent home gateway. It connects a computer to various existing household appliances and emerging digital household appliances to provide one home information control centre such that a user can check and monitor various information in his/her home through various communication means anytime anywhere. For example, a home gateway access device based on J2ME is disclosed in Chinese patent application No. 200420024835.2, but the realization of the patent is based on access to the home network by a mobile telephone of J2ME, which requires that the mobile phone support J2ME as well. Chinese patent application No. 200510061000.3 relates to using a short messaging service (SMS) server to support remote control of a gateway by a mobile phone via the SMS, which requires that a dedicated SMS server be added in the network.

In addition, the existing home gateways also have the following shortcomings: the user is unable to obtain a dynamic IP address of a home gateway conveniently anytime anywhere; home networking devices can not be found and configured automatically; and remote control operation is troublesome, and the cost is high.

CONTENT OF THE INVENTION

A technical problem to be solved by the present invention is to provide a method and wireless network card for remotely controlling household appliances so as to solve the defect in the prior art that remote control of the household appliances can not be achieved conveniently.

In order to solve the above-mentioned problem, the present invention provides a method for remotely controlling household appliances comprising:

storing corresponding relation between household appliance identification information, operation action instructing information and control signal encoding format in a wireless network card integrated with a remote control circuit;

a terminal sending a remote control command to a specified wireless network card, the remote control command carrying at least identification information of a controlled household appliance and operation action instructing information; and after receiving the remote control command, the wireless network card analyzing the remote control command and sending a control signal in a corresponding encoding format to the controlled household appliance using the remote control circuit according to the carried identification information of the controlled household appliance, the operation action instructing information and the locally stored corresponding relation.

The wireless network card is configured with a subscriber identity module (SIM) card.

In the step of the terminal sending the remote control command to the specified wireless network card, the terminal sends the remote control command to the specified wireless network card through a short message under control of a user.

The wireless network card is configured with a subscriber identity module (SIM) card.

The step of the terminal sending the remote control command to the specified wireless network card comprises: the terminal remotely accessing to a host machine served by the wireless network card, and sending the remote control command to the wireless network card using corresponding software running on the host machine by sending a short message to the wireless network card.

A format of the short message is: command header+household appliance identification information+operation action instructing information, the command header being used for indicating that the short message is a remote control command.

In the step of the wireless network card analyzing the remote control command and sending the control signal in the corresponding encoding format to the controlled household appliance using the remote control circuit, after analyzing the received short message, and only after determining that the short message is composed of three portions and carries the specific command header, the wireless network card sends the control signal in the corresponding encoding format to the controlled household appliance according to the identification information of the controlled household appliance and the operation action instructing information and the locally stored corresponding relation.

Storing the corresponding relation between the household appliance identification information, operation action instructing information and control signal encoding format in the wireless network card means that corresponding relation between the household appliance identification information, the operation action instructing information and key information is stored in the wireless network card, and corresponding relation between the key information and the control signal encoding format is stored in the remote control circuit.

The step of the wireless network card sending the control signal in the corresponding encoding format to the controlled household appliance using the remote control circuit comprises: the wireless network card finding corresponding key information according to the household appliance identification information and the operation action instructing information carried in the remote control command and then sending the key information to the remote control circuit; and the remote control circuit finding the corresponding control signal encoding format according to the received key information, and modulating and encoding the control signal in the encoding format to send to the controlled household appliance.

The present invention further provides a wireless network card comprising a storage module, a receiving module, an analyzing module, a search module and a remote control circuit.

The storage module is configured to store corresponding relation between household appliance identification information, operation action instructing information and key information.

The receiving module is configured to receive a remote control command sent by a terminal, and send the remote control command to the analyzing module, the remote control command carrying at least identification information of a controlled household appliance and operation action instructing information.

The analyzing module is configured to analyze the received remote control command, and send the identification information of the controlled household appliance and the operation action instructing information carried in the analyzed remote control command to the search module.

The search module is configured to search in the storage module according to the received identification information of the controlled household appliance and the operation action instructing information, and send the searched corresponding key information to the remote control circuit.

The remote control circuit is configured to store the corresponding relation between the key information and the control signal decoding format, and after receiving the key information, search the corresponding control signal encoding format, and modulate and encode the control signal in the encoding format to send to the controlled household appliance.

The wireless network card is configured with a subscriber identity module (SIM) card.

The receiving module is configured to receive the remote control command sent by the terminal, i.e., receive the remote control command sent by the terminal through a short message.

The wireless network card is configured with a subscriber identity module (SIM) card, and further comprises a sending module.

The sending module is configured to send the remote control command to the receiving module through a short message.

The receiving module is configured to receive the remote control command sent by the terminal, i.e., receive the remote control command sent by the sending module through the short message.

The format of the short message is: command header+ household appliance identification information+operation action instructing information, the command header being used for indicating that the short message is a remote control command.

The analyzing module is configured to analyze the received remote control command by analyzing the received short message and sending the identification information of the controlled household appliance and the operation action instructing information carried in the remote control command to the search module only after determining that the short message is composed of three portions and carries the specific command header, and to send information carried in the analyzed remote control command to the search module.

Compared with the prior art, the present invention is based on the existing mature communication technology and remote control technology, and can save the cost greatly compared with intelligent household appliances capable of receiving short messages, and is simple to implement and convenient to operate. The present invention allows household appliances to be remotely controlled by a mobile phone or a data card terminal through short messages and to be controlled through remote log-on of a PC. In addition, a control computer can control the household appliances at any time to accomplish a certain action without influence of geographic locations.

PREFERRED EMBODIMENTS OF THE PRESENT INVENTION

Figure 1:
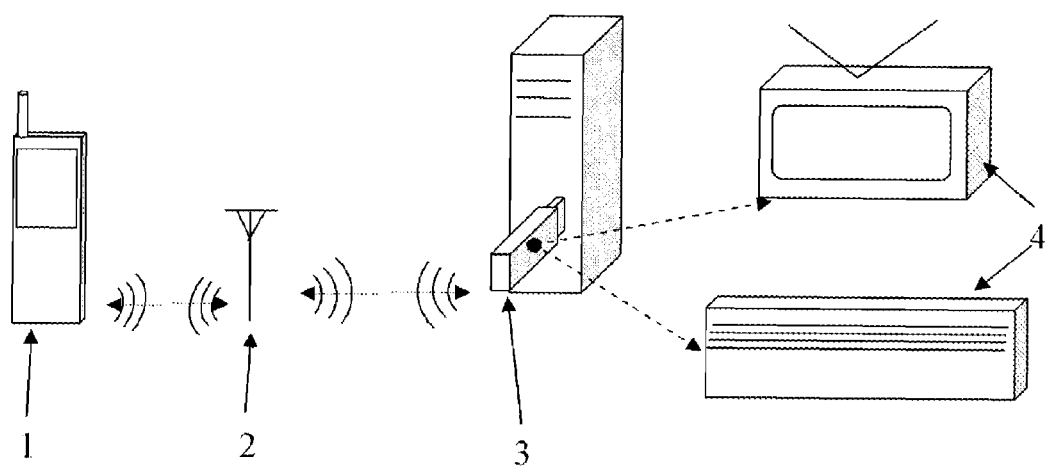
FIG. 1 is a structure diagram of a system for controlling household appliances using a wireless network card according to an embodiment of the present invention.

The technical scheme of the present invention is described in detail in conjunction with the accompanying drawings and embodiments hereinafter.

The basic conception of a method in accordance with the present invention is that corresponding relation between household appliance identification information, operation action instructing information and control signal encoding format is stored in a wireless network card integrated with a remote control circuit; a terminal sends a remote control command carrying at least identification information of a controlled household appliance and operation action instructing information to a specified wireless network card; and after receiving the remote control command, the wireless network card analyzes the remote control command and sends a control signal in a corresponding encoding format to the controlled household appliance using the remote control circuit based on the carried identification information and the locally stored corresponding relation. The controlled household appliance mentioned in the present invention is a household appliance whose operation can be controlled by a corresponding controller under normal service condition, and the wireless network card is a wireless network card in a normal working state.

Since a subscriber identity module (SIM) card can be configured in an existing 3G wireless network card and the wireless network card can send and receive short messages normally through the SIM card, preferably, a terminal can send a remote control command to the wireless network card through a short message. The format of the short message may be: command header+household appliance identification information+operation action instructing information, wherein the specific command header is used for indicating that the short message is a remote control command. After analyzing the received short message, and only after determining that the short message is composed of three portions and carries the specific command header, the wireless network card sends a control signal in a corresponding encoding format to the specified controlled household appliance based on information carried in the short message and the locally stored corresponding relation.

In order to implement the purpose of controlling a plurality of controlled household appliances using one remote control circuit, the structure of the remote control circuit can adopt the structure of a control circuit in an existing universal remote controller. In the universal remote controller, codes of various formats of hundreds of homologous or heterogeneous controllers of different models are assembled in one remote control circuit, and the corresponding relation between each encoding format and information of one key or information of combinations of a plurality of keys on the universal remote controller is stored in the remote control circuit. If the function of some key on the remote controller is set to turn on a television during the configuration, then when the universal remote controller detects that the key is pressed, it can detect a corresponding encoding format based on the information of the key, and modulate and encode a control signal generated by itself in the encoding format, and transmits the processed signal. After the television receives the signal, it can perform the corresponding action. Since a large number of infrared remote control application specific integrated circuits are manufactured by many manufacturers, they can be used according to actual requirements, which will not be described in detail here.

The corresponding relation between household appliance identification information, operation action instructing information and control signal encoding format being stored in a wireless network card means that the corresponding relation between the household appliance identification information, the operation action instructing information and key information (here the key information refers to information of a single key or information of combinations of a plurality of keys) is stored in the wireless network card, and the corresponding relation between the key information and the control signal encoding format is stored in the remote control circuit. After the wireless network card finds the corresponding key information according to the household appliance identification information and the operation action instructing information carried in the remote control command, it sends the key information to the remote control circuit, which finds the corresponding control signal encoding format according to the key information and performs the subsequent process procedure.

The existing universal remote controller generally sets functions corresponding to keys thereon through the following two manners.

1. A "setting" key of the universal remote controller is pressed and held, then a "power" key is pressed once, and then both keys are released. At this point a "light" on the top left of the universal remote controller should be lit up, indicating that it has entered into a "setting" state (for some universal remote controllers, only one key is required to be pressed to enter into setting state). Then several groups of 3-bit codes of the corresponding television brand are found in the specification, and numerical keys on the universal remote controller are pressed to input one group of the codes. After the 3-bit codes have been input, the "light" on the left top goes out. At this point whether all keys work correspondingly can be tested manually. If there are some keys that are not corresponding to their functions, then the next group of codes is input, until all functions are corresponding to their corresponding keys.

2. The main difference between a universal remote controller and an ordinary remote controller lies in that the universal remote controller can receive and store infrared signals, in addition to transmitting the infrared signals like the ordinary remote controller. Therefore, the existing universal remote controller basically have the ability of "learning" infrared signal codes of the original remote controller, that is to say, the original remote controller of a certain household appliance can be used to transmit the infrared signals to the universal remote controller. The universal remote controller receives infrared signal codes of each key on the original remote controller. Each key on the original remote controller will "learn" the infrared signal codes of the keys on the original remote controller.

In addition, there is a method for controlling household appliances using the system. That is, a user remotely logs on a PC configured with the wireless network card described above using a PC, and then sends a remote control command to the wireless network card through a short message by operating software of the wireless network card directly, in order to control the wireless network card to perform the corresponding action, the principle of which is same as the short message control described above and will not be repeated herein.

The wireless network card in accordance with the present invention includes a storage module, a receiving module, an analyzing module, a search module and a remote control circuit.

The storage module is configured to store corresponding relation between household appliance identification information, operation action instructing information and key information.

The receiving module is configured to receive a remote control command sent by a terminal, and send the command to the analyzing module, wherein the remote control command carries at least identification information of a controlled household appliance and operation action instructing information.

The analyzing module is configured to analyze the received remote control command, and send the information carried in the analyzed remote control command to the search module.

The search module is configured to search in the storage module based on the received information, and send the searched corresponding key information to the remote control circuit.

The remote control circuit is configured to store the corresponding relation between the key information and the control signal decoding format, and after receiving the key information, search the corresponding control signal encoding format, and modulate and encode a control signal based on the encoding format to send to the controlled household appliance.

Furthermore, the wireless network card can be configured with a SIM card; and the receiving module is configured to receive the remote control command sent by a terminal, i.e., receive the remote control command sent by the terminal through a short message.

In addition, since the wireless network card is configured with a SIM card, the wireless network card can further comprise a sending module.

The sending module is configured to send the remote control command to the receiving module through a short message under remote control of a user. The receiving module is configured to receive the remote control command sent by a terminal, i.e., receive the remote control command sent by the sending module through the short message.

In the two manners described above, the format of the short message may be: command header+household appliance identification information+operation action instructing information, where the specific command header is used for indicating that the short message is a remote control command.

The analyzing module is configured to analyze the received remote control command by analyzing the received short message and sending the identification information of the controlled household appliance and the operation action instructing information carried in the remote control command to the search module only after determining that the short message is composed of three portions and carries the specific command header, and to send information carried in the analyzed remote control command to the search module.

The present invention will be described through an application embodiment hereinafter.

Figure 2:
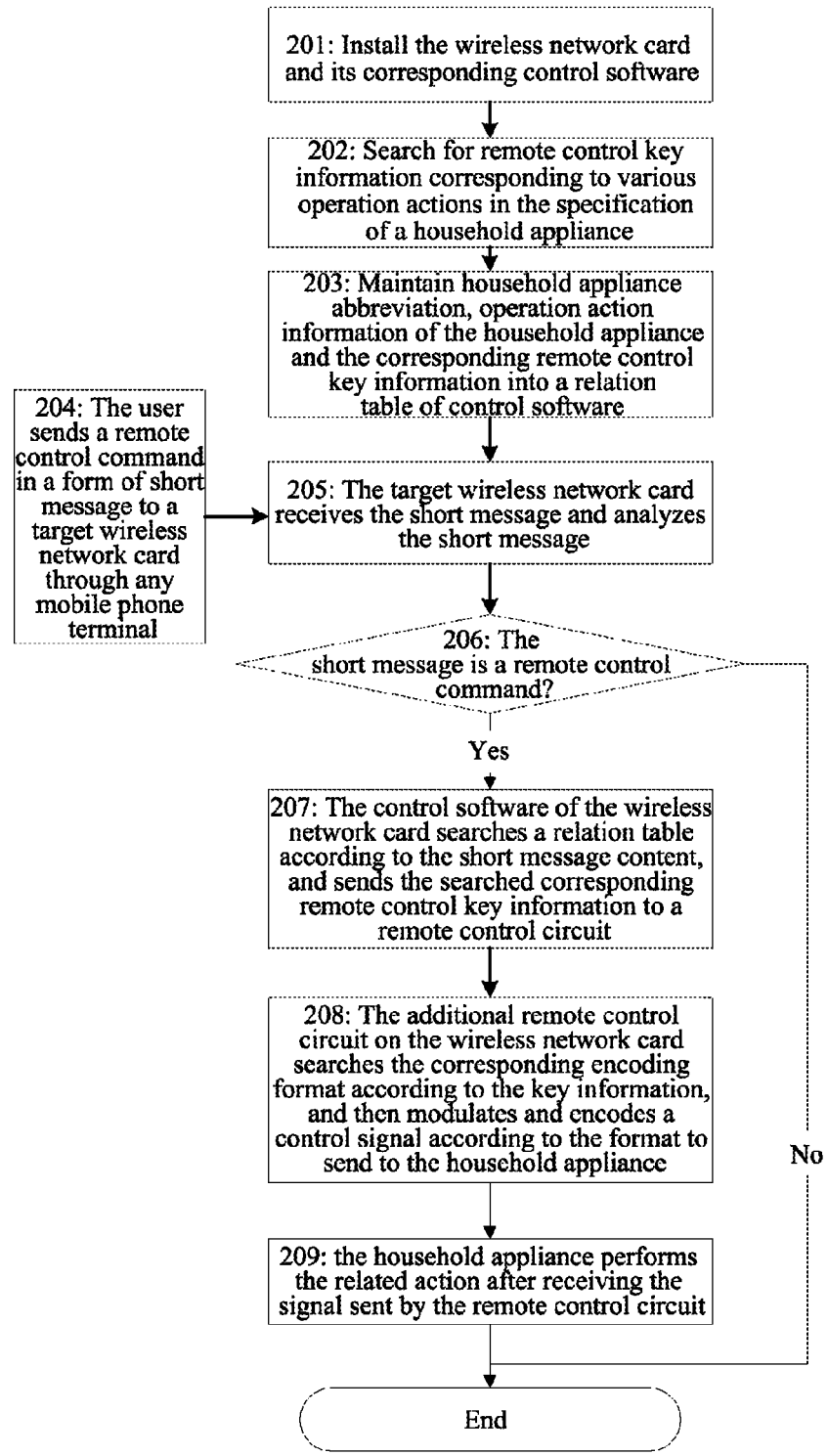
FIG. 2 is a flow chart of a specific method for controlling household appliances using a wireless network card according to an embodiment of the present invention.

The present embodiment is applied to a system as shown in FIG. 1, which includes a mobile phone 1 capable of receiving and sending short messages, a wireless network base station 2 of 2G or 3G, a wireless network card 3 configured with a remote control circuit of a universal remote controller, and a household appliances 4, such as television, DVD machine, air conditioner, etc. The mobile phone 1 communicates with the wireless network card 2 via a wireless network, and specific communication carriers are short messages. As shown in FIG. 2, a procedure of controlling household appliances using a wireless network card specifically includes the following steps.

In step 201, a user installs the wireless network card and its corresponding control software on a PC.

In step 202, the user searches for remote control key information corresponding to various operation actions in the specification of a household appliance.

In step 203, the corresponding relation between household appliance abbreviation (that is, household appliance identification information), operation action information of the household appliance and the corresponding remote control key information is added to a relation table of control software of the wireless network card.

For example, the corresponding relations between the switching function of a DVD machine and the digital key 1 of the universal remote controller and between the switching function of a television and the digital key 2 of the universal remote controller are stored in the relation table. Thus, the wireless network card can find the corresponding key information according to the household appliance identification information and the operation action instructing information.

In step 204, the user sends a remote control command in a form of short message to a target wireless network card through any mobile phone terminal.

The short message must be written in a specific format when sent through the mobile phone terminal. This format can be defined by software of the wireless network card, for example, the content of the short message is "CZ KT OPEN", where CZ is a specific command header, KT is identification information of an air conditioner, and OPEN indicates turning-on operation action information.

In step 205, the target wireless network card analyzes the short message after receiving the short message.

In step 206, the control software of the wireless network card determines whether the short message is a remote control command. The structure of the short message defined according to the above example can be interpreted as analyzing whether the short message is composed of three portions, and the content of the first portion is "CZ". If yes, then the next step is executed, otherwise, the procedure ends.

In step 207, the control software of the wireless network card searches a relation table and looks up the remote control key information of the corresponding household appliance according to the content of the short message, and then sends the key information to a remote control circuit on the wireless network card.

In step 208, the additional remote control circuit on the wireless network card searches the corresponding encoding format according to the key information, and then modulates and encodes a control signal according to the format to send to the household appliance.

In step 209, the household appliance performs the related action after receiving the signal sent by the remote control circuit.

The embodiment described above is only one embodiment. The user may perform communication of action control of the household appliances through short messages in other formats, which belongs to the scope of the present invention.

It may be understood by those skilled in the art that all or some of the steps in the described method can be implemented by related hardware instructed by programs which may be stored in computer readable storage mediums, such as read-only memory, disk or CD-ROM, etc. Alternatively, all or some of the steps in the embodiments described above may also be implemented using one or more integrated circuits. Accordingly, each module/unit in the embodiments described above may be implemented in a form of hardware, or software functional module. The present invention is not limited to combinations of hardware and software in any particular form.

Other various embodiments of the present invention may also be possible. Various modifications and variations to the present invention may be made by those skilled in the art without departing from the spirit and essence of the present invention. However, these corresponding modifications and variations should be covered in the protection scope of the appended claims of the present invention.

Industrial Applicability

The present invention is based on the existing mature communication technology and remote control technology, and can save the cost greatly compared with intelligent household appliances capable of receiving short messages, and is simple to implement and convenient to operate. The present invention allows household appliances to be remotely controlled by a mobile phone or a data card terminal through short messages and to be controlled through remote log-on of a PC. In addition, a control computer can control the household appliances at any time to accomplish a certain action without influence of geographic locations.

What I claim is:

1. A method for remotely controlling household appliances comprising:

integrating a remote control circuit in a wireless network card, and storing corresponding relation between household appliance identification information, operation action instructing information and control signal encoding format in the wireless network card;

a terminal sending a remote control command to a specified wireless network card, the remote control command carrying at least identification information of a controlled household appliance and operation action instructing information; and after receiving the remote control command, the wireless network card analyzing the remote control command and sending a control signal in a corresponding encoding format to the controlled household appliance using the remote control circuit according to the carried identification information of the controlled household appliance, the operation action instructing information and the locally stored corresponding relation.

2. The method according to claim 1, wherein
the wireless network card is configured with a subscriber identity module (SIM) card; and
in the step of the terminal sending the remote control command to the specified wireless network card, the terminal sends the remote control command to the specified wireless network card through a short message under control of a user.

3. The method according to claim 2, wherein
a format of the short message is: command header+household appliance identification information+operation action instructing information, the command header being used for indicating that the short message is a remote control command; and
in the step of the wireless network card analyzing the remote control command and sending the control signal in the corresponding encoding format to the controlled household appliance using the remote control circuit, after analyzing the received short message, and only after determining that the short message is composed of three portions and carries the specific command header, the wireless network card sends the control signal in the corresponding encoding format to the controlled household appliance according to the identification information of the controlled household appliance and the operation action instructing information and the locally stored corresponding relation.

4. The method according to claim 1, wherein
the wireless network card is configured with a subscriber identity module (SIM) card; and
the step of the terminal sending the remote control command to the specified wireless network card comprises: the terminal remotely accessing to a host machine served by the wireless network card, and sending the remote control command to the wireless network card using corresponding software running on the host machine by sending a short message to the wireless network card.

5. The method according to claim 4, wherein:
a format of the short message is: command header+household appliance identification information+operation action instructing information, the command header being used for indicating that the short message is a remote control command; and
in the step of the wireless network card analyzing the remote control command and sending the control signal in the corresponding encoding format to the controlled household appliance using the remote control circuit, after analyzing the received short message, and only after determining that the short message is composed of three portions and carries the specific command header, the wireless network card sends the control signal in the corresponding encoding format to the controlled household appliance according to the identification information of the controlled household appliance and the operation action instructing information and the locally stored corresponding relation.

6. The method according to claim 1, wherein
storing the corresponding relation between the household appliance identification information, operation action instructing information and control signal encoding format in the wireless network card means that corresponding relation between the household appliance identification information, the operation action instructing information and key information is stored in the wireless network card, and corresponding relation between the key information and the control signal encoding format is stored in the remote control circuit; and
the step of the wireless network card sending the control signal in the corresponding encoding format to the controlled household appliance using the remote control circuit comprises: the wireless network card finding corresponding key information according to the household appliance identification information and the operation action instructing information carried in the remote control command and then sending the key information to the remote control circuit; and the remote control circuit finding the corresponding control signal encoding format according to the received key information, and modulating and encoding the control signal in the encoding format to send to the controlled household appliance.

7. A wireless network card comprising a storage module, a receiving module, an analyzing module, a search module and a remote control circuit; wherein
the storage module is configured to store corresponding relation between household appliance identification information, operation action instructing information and key information;
the receiving module is configured to receive a remote control command sent by a terminal, and send the remote control command to the analyzing module, the remote control command carrying at least identification information of a controlled household appliance and operation action instructing information;
the analyzing module is configured to analyze the received remote control command, and send the identification information of the controlled household appliance and the operation action instructing information carried in the analyzed remote control command to the search module;
the search module is configured to search in the storage module according to the received identification information of the controlled household appliance and the operation action instructing information, and send the searched corresponding key information to the remote control circuit; and
the remote control circuit is configured to store the corresponding relation between the key information and the control signal decoding format, and after receiving the key information, search the corresponding control signal encoding format, and modulate and encode the control signal in the encoding format to send to the controlled household appliance.

8. The wireless network card according to claim 7, wherein
the wireless network card is configured with a subscriber identity module (SIM) card; and
the receiving module is configured to receive the remote control command sent by the terminal, i.e., receive the remote control command sent by the terminal through a short message.

9. The wireless network card according to claim 8, wherein
the format of the short message is: command header+household appliance identification information+operation action instructing information, the command header being used for indicating that the short message is a remote control command; and
the analyzing module is configured to analyze the received remote control command by analyzing the received short message and sending the identification information of the controlled household appliance and the operation action instructing information carried in the remote control command to the search module only after determining that the short message is composed of three portions and carries the specific command header, and to send information carried in the analyzed remote control command to the search module.

10. The wireless network card according to claim 7, wherein
the wireless network card is configured with a subscriber identity module (SIM) card, and further comprises a sending module;
the sending module is configured to send the remote control command to the receiving module through a short message; and
the receiving module is configured to receive the remote control command sent by the terminal, i.e., receive the remote control command sent by the sending module through the short message.

11. The wireless network card according to claim 10, wherein:
the format of the short message is: command header+ household appliance identification information+operation action instructing information, the command header being used for indicating that the short message is a remote control command; and
the analyzing module is configured to analyze the received remote control command by analyzing the received short message and sending the identification information of the controlled household appliance and the operation action instructing information carried in the remote control command to the search module only after determining that the short message is composed of three portions and carries the specific command header, and to send information carried in the analyzed remote control command to the search module.

* * * * *